United States Patent Office 3,095,651
Patented July 2, 1963

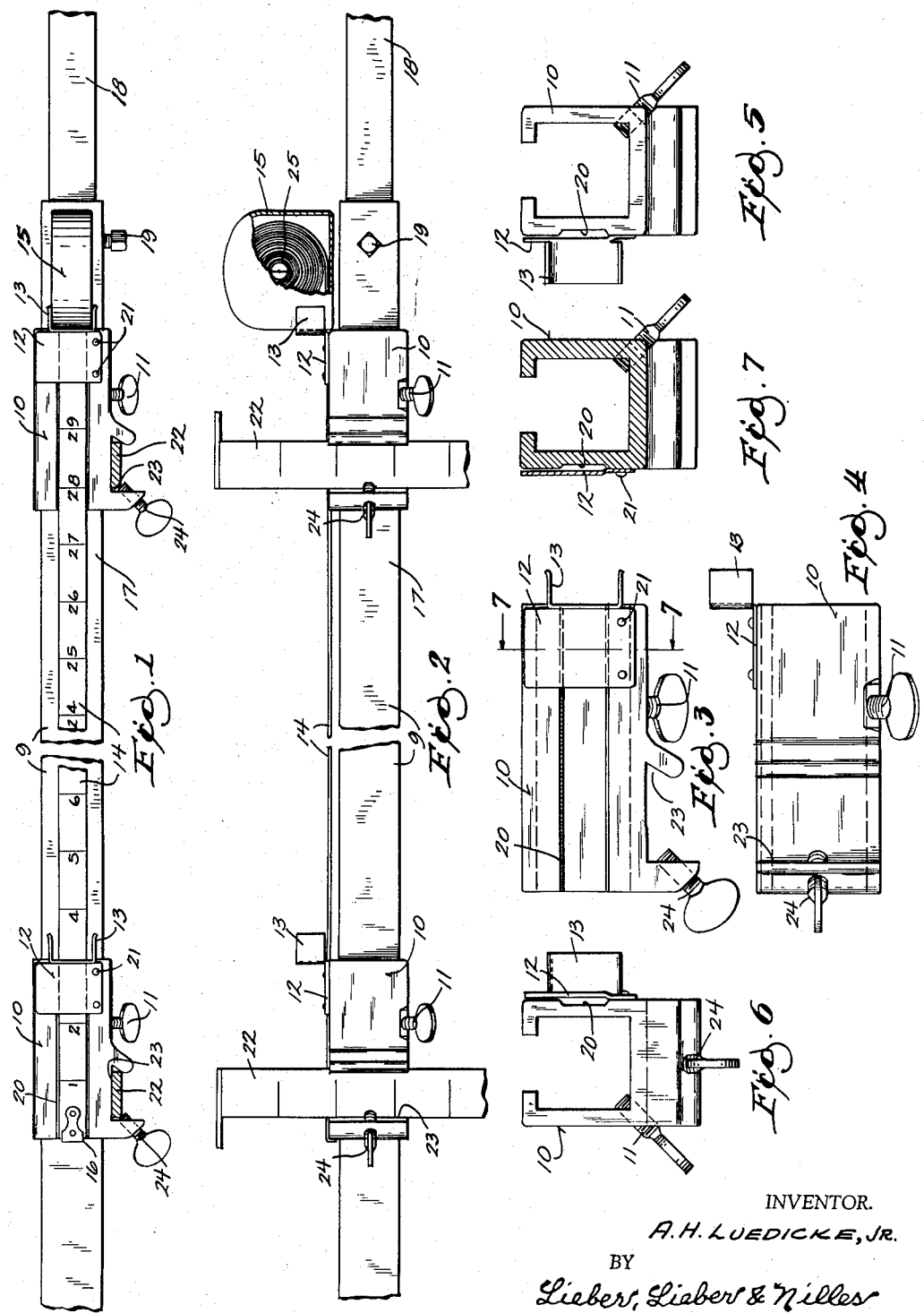

3,095,651
TRAM GAGE
Alexander H. Luedicke, Jr., Milwaukee, Wis., assignor to Applied Power Industries, Inc., a corporation of Wisconsin
Filed Mar. 28, 1960, Ser. No. 18,067
7 Claims. (Cl. 33—158)

This invention relates generally to improvements in the art of measuring and indicating, and its relates more specifically to improvements in the construction and operation of tram gages for effecting measurement and for visibly indicating the distance between spaced and more or less obstructed points on diverse articles.

The primary object of the present invention is to provide an improved tram gage which is simple in construction and flexible in its adaptations.

Tram gages are used quite extensively in automobile repair work for the purpose of measuring the distances between spaced points on the vehicle frames and which are frequently obscured from view by obstructions such as the propelling engines, power transmissions, running gear, or the like, and which are usually located on the frames or undercarriages of the automobiles. The gages heretofore employed for such purposes generally embodied an elongated element or bar adapted to coact with the part to be measured and having thereon adjustable members which could be located along the bar at the selected points and to which a ruler or measuring tape could be applied in order to obtain the desired measurement. While these prior tram gages were relatively satisfactory when used to measure relatively short distances within the normal reach of the person making the measurement, it required a two man performance in order to accurately measure distances beyond such normal reach, especially when abnormal obstructions to the measurement were encountered.

It is therefore an important more specific object of the present invention to provide a tram gage assemblage which obviates such difficulty and which is manipulable by a single individual to obtain accurate measurements under most adverse conditions.

Another important object of this invention is to provide an improved tram gage adapted to utilize an ordinary spiral wound flexible measuring tape in order to accurately measure the distance between remotely spaced points on diverse articles.

A further important object of the invention is to provide a simplified and conveniently operable gaging device which is adjustably disposable upon a longitudinally extensible beam or element, and which is provided with spring clips for detachably receiving and holding an ordinary flexible measuring tape in distended position while measurements are being made.

Still another object of this invention is to provide an improved distance measuring gage embodying a pair of relatively adjustable brackets or crossheads adapted to be suspended from the article being measured and to effectively cooperate with an ordinary spring actuated flexible tape measure to accurately indicate the distance between spaced points or localities.

These and other more specific objects and advantages of the invention will be apparent from the following description.

A clear conception of the features constituting the present improvement, and of the construction and operation of a tram gage embodying the invention, may be had by referring to the drawing accompanying and forming a part of this specification wherein like reference characters designate the same or similar parts in the various views.

FIG. 1 is a top view of one of the gage assemblages embodying a pair of the improved tape holding brackets adjustably attached to a fragment of an elongated bar element at spaced points, and showing an ordinary measuring tape applied thereto;

FIG. 2 is a side elevation of the assemblage shown in FIG. 1 also showing fragments of upright suspension rods which may be applied to the brackets;

FIG. 3 is an enlarged top view of one of the improved tape holding brackets shown in FIGS. 1 and 2;

FIG. 4 is a similarly enlarged side elevation of the same tape holding bracket;

FIG. 5 is one end view of the enlarged bracket;

FIG. 6 is an opposite end view of the same bracket, and

FIG. 7 is a transverse section through the bracket taken along the line 7—7 of FIG. 3.

While the invention has been illustrated and described as having been embodied in a tram gage assemblage having special utility in the automobile repair work field, it is not intended to limit its use to such field; and it is also contemplated that specific descriptive terms employed herein be given the broadest interpretation consistent with the actual disclosure.

Referring to the drawing, the tram gage assembly shown therein comprises in general, an elongated element or bar 9 adapted to be applied to the work; a pair of brackets 10 each slidably adjustable along and attachable to selected spaced portions of the bar 9 by means of a thumb screw 11, and each also having a tape engaging clip 12 secured thereto and provided with laterally spaced ears 13; and an ordinary flexible measuring tape 14 normally spirally wound within a housing 15 adapted to be disposed between the ears 13 of one bracket clip 12, and to be distended and applied beneath both of these clips so as to span the gap between the brackets 10 while its free end hook 16 coacts with an end of the remote bracket.

The gage bar 9 is preferably of rigid construction and of polygonal cross-section, and may be formed of outer and inner telescoping sections 17, 18, respectively, in order to vary its length, while these sections may be clamped in adjusted position by means of a set screw 19 or the like. The two brackets 10 may be of interchangeably similar construction being formed to slide easily along the outer bar section 17 without rotating about the bar 9, and the tops of these brackets may also provided with shallow rectilinear grooves 20 for guiding the flexible tape measure 14 while being applied. Each of the clips 12 is preferably formed of a single piece of resilient sheet metal, and is attached to its bracket 10 so as to span the adjacent groove 20 by means of screws or rivets 21 and to cooperate with this groove so as to clamp the tape 14 therein.

Each bracket 10 may also be provided with a calibrated upright indicating rod 22 adapted to be vertically adjustably confined within a recess 23 formed in the bracket, and which may be clamped in adjusted position by another thumb screw 24. These rods 22 may be in the form of indicating pointers or they may be provided with hooks of well known construction for suspension purposes, adapted to be applied to the side channels of automobile frames or the like, in order to level the bar 9 of the assemblage when hung from the article being measured. The tape measure may also be of the well known available type, consisting of a flexible calibrated tape spirally wound and normally confined within the housing 15 by a coil spring 25 but adapted to be distended to any desired length, thus completing the gage assembly.

When the various parts of the improved tram gage assemblage have been constructed as above described, its normal use is as follows. The upright rods 22 should be laterally positioned by adjusting the brackets 10 along and clamping them to the bar 9 with the aid of the thumb screws 11 so that the outer edges of the flat rods are located at the spaced points to be measured. The suspension rods 22 should also be vertically adjusted within the recesses 23 and clamped in position with the aid of the thumb screws 24 and attached to the article, so that the bar 9 will be disposed horizontally either below or above the article to be measured with the brackets 10 readily accessible and the clips 12 unobstructed and visible. The housing 15 of the tape measure may then be applied between the ears 13 of one of the brackets 10, and the flexible tape 14 can thereafter be pulled out of the housing and inserted beneath the clips 12 of the spaced brackets whereupon the hook 16 at the free end of the tape measure may be applied to the end of the other bracket 10 as illustrated in FIGS. 1 and 2.

The spring within the housing 15 will then maintain the tape 14 in taut condition while the resilient clips 12 will hold the tape frictionally but firmly confined within the shallow grooves 20 so that the calibrated tape 14 will accurately and visibly indicate the pricise distance between the points to be measured. All of these operations may be quickly and conveniently performed by a single individual even if the distances measured are well beyond the reach of such individual, and the adjustability of the bar 9, brackets 10 and rods 22 enables the tram gage to be applied to various kinds of articles or work which is to be measured. The device is simplified by providing two interchangeably similar bracket assemblages and by permitting the use of ordinary tape measures which are readily available, and the invention has proven highly satisfactory and advantageous especially when applied to automobile frames or undercarriages.

Various modes of carrying out the invention are contemplated as being within the scope of the following claims particularly pointing out and distinctly claiming the subject matter which is regarded as the invention.

What is claimed and desired to be secured by Letters Patent is:

1. In a tram gage which utilizes a flexible housed tape to measure distances between spaced points, an elongated rigid element disposable in proximity to the spaced points to be measured, and a pair of brackets attachable to the element adjacent to said points, one of said brackets being formed to position the tape housing relative to the bar and each of the brackets having thereon a resilient clip for receiving and frictionally clamping the tape to its respective bracket to hold the tape stretched across the gap between said brackets.

2. In a tram gage which utilizes a flexible housed tape to measure distances between spaced points, an elongated element disposable in proximity to the spaced points to be measured, and a pair of interchangeably similar brackets adjustable along the element to position the brackets adjacent to said points, at least one of said brackets being formed to position the tape housing near one of said point and each of the brackets having thereon a spring clip for receiving and frictionally engaging and holding the tape withdrawn from said housing while stretched in taut condition across the space between said brackets.

3. In a tram gage which utilizes a flexible housed tape to measure distances between spaced points, an elongated element disposable in proximity to the spaced points to be measured, a pair of brackets adjustable along the element and each having thereon a spring clip directly frictionally engageable with a flexible tape stretched across the space between said brackets, and an upright calibrated indicating member adjustably secured to each of said brackets.

4. In a tram gage which utilizes a flexible housed tape to measure distances between spaced points, an elongated element disposable in proximity to and spanning the spaced points to be measured, a pair of similar brackets adjustable along said element and each having a shallow groove formed therein, each of said brackets having thereon a spring clip directly frictionally engageable with a flexible tape confined within said groove and spanning the space between said points, and an upright calibrated rigid indicating rod vertically adjustably secured to each of said brackets at said points.

5. In a tram gage which utilizes a flexible housed tape to measure distances between spaced points, an elongated element disposable in proximity to the spaced points to be measured, a pair of brackets adjustable along the element to position the brackets adjacent to said points, said brackets being formed with alined grooves with one of said brackets being formed to position the tape housing near one of said points while the other is formed to hold the free end of the tape when withdrawn from said housing, and a resilient member on each bracket engageable with said tape to hold the same within said grooves and stretched in taut condition across the space between said brackets.

6. In a tram gage for utilizing a flexible tape normally spring retracted into a housing to measure distances between spaced points, a rigid bar positionable to span the spaced points to be measured, a pair of interchangeably similar brackets adjustable along said bar and each having therein a shallow groove extending longitudinally of the bar, and a resilient clip carried by each of said brackets and spanning the groove therein to frictionally hold the tape housing near one of said points and to frictionally retain the extended tape within said grove and stretched in taut condition between said brackets.

7. In a tram gage for utilizing a flexible tape normally confined within a housing to measure distances between spaced points, a rigid bar disposable in proximity to the spaced points to be measured, a pair of rigid brackets adjustable along said bar, a spring clip carried by each of said brackets, each of said clips being formed to hold the tape housing and to frictionally retain the tape extended between said brackets, and a calibrated indicating member secured to each of said brackets for independent adjustment transversely of said bar.

References Cited in the file of this patent
UNITED STATES PATENTS

| | | |
|---|---|---|
| 1,203,504 | Diskin | Oct. 31, 1916 |
| 1,782,827 | Lahr | Nov. 25, 1930 |
| 2,731,989 | Valcourt et al. | Jan. 24, 1956 |
| 2,747,625 | Small | May 29, 1956 |

FOREIGN PATENTS

| | | |
|---|---|---|
| 364,025 | Great Britain | Dec. 28, 1931 |
| 365,966 | Great Britain | Jan. 28, 1932 |